United States Patent [19]
Klitz

[11] 4,126,082
[45] Nov. 21, 1978

[54] TRAVEL-BRAKE CONTROL SYSTEM

[75] Inventor: Ronald J. Klitz, Mosinee, Wis.

[73] Assignee: J. I. Case Company, Racine, Wis.

[21] Appl. No.: 824,852

[22] Filed: Aug. 15, 1977

Related U.S. Application Data

[63] Continuation of Ser. No. 578,111, May 16, 1975, abandoned.

[51] Int. Cl.² .............................................. F15B 15/26
[52] U.S. Cl. .......................................... 91/41; 91/508; 91/461
[58] Field of Search ...................... 91/41, 44, 45, 450, 91/461, 411 R, 413; 137/625.6

[56] References Cited
U.S. PATENT DOCUMENTS

| 3,508,794 | 4/1970 | Engle | 91/44 |
| 3,685,290 | 8/1972 | Krusche | 91/461 |

Primary Examiner—Martin P. Schwadron
Assistant Examiner—Abraham Hershkovitz
Attorney, Agent, or Firm—Dressler, Goldsmith, Clement, Gordon & Shore, Ltd.

[57] ABSTRACT

A hydraulic control system for use with a vehicle having an earthworking implement and having a plurality of components operated by hydraulic motor means having hydraulic release type brakes associated therewith and including means responsive to actuation of the brake for precluding operation of the motor associated therewith and responsive to release of the brake for permitting operation of the motor.

3 Claims, 2 Drawing Figures

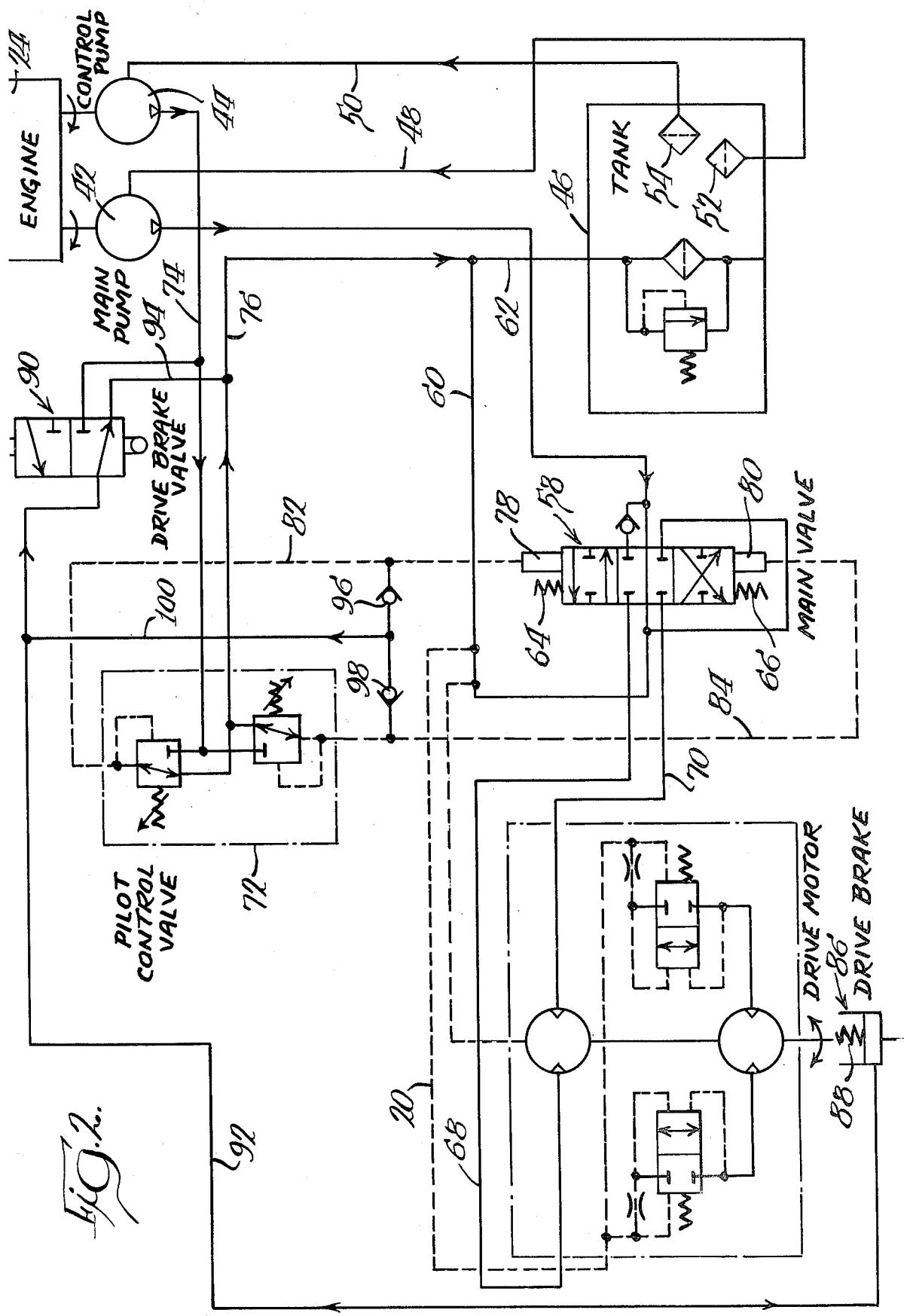

TRAVEL-BRAKE CONTROL SYSTEM

This is a continuation of application Ser. No. 578,111, filed May 16, 1975, now abandoned.

BACKGROUND OF THE INVENTION

This invention relates to a hydraulic circuit for supplying hydraulic fluid to a plurality of hydraulic drive members found in heavy equipment, such as excavators, backhoes and the like.

In recent years, the use of hydraulic drive systems for controlling the various functions in heavy equipment, such as excavators, has become more common. For example, quite recently, completely hydraulic systems have been developed for use with heavy duty vehicles such as excavators. In such systems, the actuation of control valves that control the flow of fluid to the various drive members is accomplished by hydraulic fluid. One example of such a system incorporates a main hydraulic circuit that includes a pump and a plurality of hydraulically actuated valves that control the flow of fluid between the pump, reservoir and hydraulic motors associated therewith. The valves are self-centering and are opened by a control circuit that is capable of supplying small amounts of fluid under pressure from a source to opposite ends of the valves for actuating the valves. The fluid flow in the control circuit is controlled by a manually operated valve and acts as a "pilot system" for actuating the main control valves.

Such a system has a number of advantages, the primary one being that the function that is being performed can be accurately controlled. For example, utilizing the "pilot system" for actuating the main valves gives the operator the ability to introduce very small amounts of fluid to the hydraulic motors.

While such systems have found a relative degree of success, limitations do exist and areas for improvement have been identified. For example, vehicles incorporating such systems are typically provided with hydraulically operated brakes typically of the hydraulic release type, associated with various of the hydraulic motors. This type of brake is released in response to the application of hydraulic pressure thereto.

One area of improvement that has been identified is the problem of operators trying to operate a hydraulic motor when the brake associated therewith is engaged. This creates problems of brake wear and premature failure and possibly other premature failures in the hydraulic system.

SUMMARY OF THE INVENTION

In accordance with the present invention, there is provided a simple, inexpensive technique for precluding operation of hydraulic motors when the brakes associated therewith are engaged. This is accomplished by inactivating and effectively locking out the hydraulic control system associated with the motor when the brake is engaged.

More specifically, such a lock out system incorporates the use of pressure actuated bypass components or valves in the control circuit which operate to preclude operation of the hydraulic motor when the brake is engaged, and which automatically respond to release of the brake to render the control system operative for use.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

BRIEF DESCRIPTION OF THE DRAWING

FIG. 2 is a schematic diagram of a hydraulic system incorporating the present invention.

DETAILED DESCRIPTION

Figure 1:
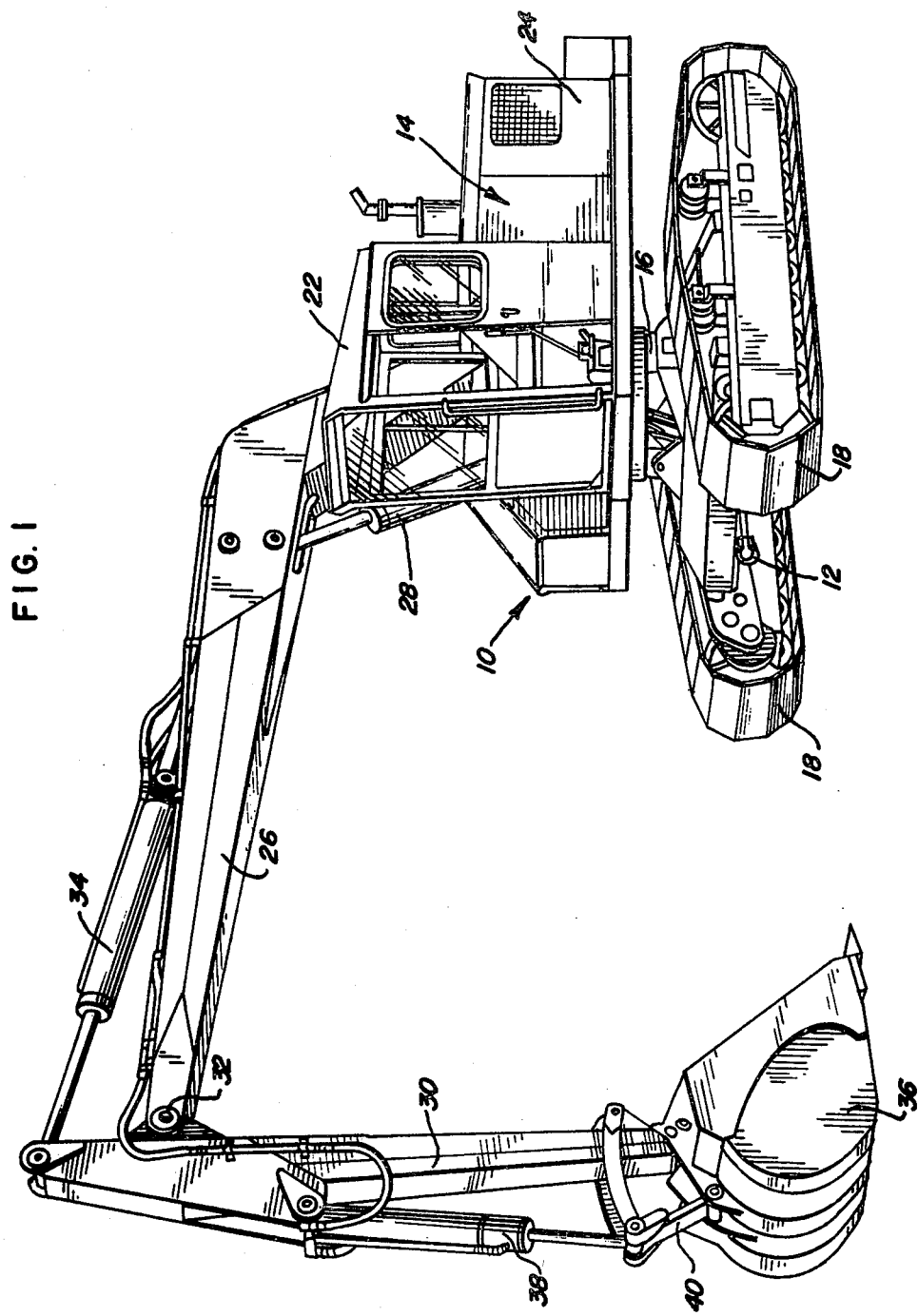
FIG. 1 is a pictorial view of a shovel-type excavator wherein the hydraulic system forming the substance of this invention is particularly useful.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Referring now to FIG. 1, there is shown a shovel-type excavator, generally indicated by reference numeral 10, having an undercarriage 12 and an upper structure 14. The upper structure is pivotally carried about a vertical axis on a turntable 16. A hydraulic motor (not shown) operated by pressurized hydraulic fluid is provided for pivoting or swinging the upper structure 14 relative to undercarriage 12.

Undercarriage 12 is supported by a pair of ground engaging members or tracks 18 which are driven by separate hydraulically operated positive displacement gear drive motor means 20 (see FIG. 2) also driven by pressurized fluid. Upper structure 14 includes a cab 22 for the operator and a propulsion unit 24, such as an engine, for driving pumps, as will be described later.

A main lift boom 26 is pivotally mounted about a horizontal pivot axis (not shown) on upper structure 14 and is pivoted by hydraulic motor means 28 illustrated as a lift or hoist cylinder and piston rod assembly interposed between upper structure 14 and boom 26.

A dipper stick 30 is pivotally connected to the outer end of boom 26 by pivot pin 32 which is substantially parallel to the axis or pivotal connection of boom 26 to upper structure 14. A second hydraulic motor means 34 is interposed between boom 26 and a free end portion of dipper stick 30. Again, hydraulic motor means 34 is illustrated as a cylinder and piston rod assembly which acts as a crowd cylinder to pivot the dipper stick 30 relative to boom 26.

A bucket 36 is pivotally mounted on the outer end of dipper stick 30 for movement about a horizontal axis by a third hydraulic motor means 38. Third hydraulic motor means 38 again consists of a cylinder and piston rod assembly which has one end connected to dipper stick 30 and the opposite end connected to bucket 36 through a linkage 40.

In a large excavator of this type, it is customary to provide two separate main hydraulic pumps which are driven by the engine or power plant of the vehicle and the respective pumps are connected to the respective hydraulic motor means through conduits having pilot operated control valves therein. Since the present invention relates only to a small portion of the entire hydraulic control system for the vehicle, only a selected portion of the system has been illustrated in FIG. 2.

FIG. 2 shows an engine 24 driving a main pump 42 and a control pump 44, both of which draw fluid from a reservoir or tank 46 through supply conduits 48, 50, respectively. Suitable filters 52, 54 may be placed at the inlets of the respective conduits 48, 50 leading from the reservoir 46, to the main pump 42 and the control pump 44.

The main pump or main pump means 42 delivers fluid under pressure from the reservoir 46 through a main supply conduit 56 to a fluid actuated main or drive valve means 58 which, in turn, is connected to the reservoir 46 through return conduits 60, 62. The drive valve means 58 consists of a three position valve which is normally biased to the illustrated center closed position by a pair of springs 64, 66, respectively, cooperating with the opposite ends of the control valve spool forming part of the drive valve means 58.

The drive valve means 58 is also connected to opposite ends of drive motor means 20 through a pair of drive motor conduits 68, 70. The drive motor means is a hydraulic motor which drives the vehicle or excavator in the forward or backward direction in response to actuation of the drive valve means 58.

The supply of fluid between the drive motor means 20, the main pump means 42 and the reservoir 46 is controlled by actuation of the drive control valve means 58 through a control circuit incorporating the control pump 44. For this purpose, the control pump 44 is connected to a manually operated control valve means or modulator valve 72 through a control supply conduit 74. The control valve means 72 is in turn connected to the reservoir through return conduits 76, 62. The control valve means 72 is also connected to opposite ends 78, 80 of the control spool of the drive valve means 58 through a pair of conduits 82, 84, respectively.

The modulator valve or control valve means 72 is actuated manually, through either a hand operated control lever or a foot lever, and is capable of being manipulated to supply fluid under pressure from the control pump 44 through either of the control spool conduits 82, 84 to either end 78, 80 to either end 78, 80 of the drive valve control spool. Since the modulator valve is a commercially available valve, no details thereof appear to be necessary. However, it should be noted that such valves are capable of accurately controlling small amounts of flow from the control pump to opposite ends of the drive valve control spool to accurately control the flow of fluid from the main pump through the drive valve means to and from the drive motor means.

A drive parking brake 86 is associated with the drive motor means 20. A brake spring 88 applies the brake when a drive brake valve means 90 is positioned, as shown in FIG. 2, to permit flow of the oil in the brake line to the reservoir or tank through a drive brake conduit 92 and return conduits 94, 76, 62. A pair of check valves 96, 98 are connected from the drive valve control conduits 82, 84 and to the brake conduit 92 through an intermediate return conduit 100.

In operation, when the drive or parking brake 86 is set, i.e., when the drive brake valve 90 is in the position shown, attempts by the operator to move the vehicle in either direction by operating the control valve 72 effects a build up of pressure in one or the other of the drive valve control conduits 82, 84 causing the corresponding check valve 96 or 98 to open and dump oil into the reservoir 46 through conduits 100, 92, drive brake valve 90 and conduits 94, 76, 62.

Release of the drive brake 86 is effected by operating the drive brake valve 90 into position wherein pressure from the control pump 44 is applied to the brake through conduits 74 and 92 to release it. Pressure in conduit 92 is also applied to the back of both check valves 96, 98 to prevent them from opening and to allow the drive function to operate in a normal manner in response to operation of the control valve means 72.

While, for convenience, the invention has been described in connection with the main drive motor means, and the main drive and control valves and circuitry associated therewith, it should be understood that it has equal application to any portion of the hydraulic system having hydraulic brake means associated with hydraulic motor means in which it is desired to preclude operation of the hydraulic motor when the brake is set or actuated, such as, for example, the hydraulic swing motor utilized to rotate the upper structure relative to the undercarriage.

Thus there has been disclosed a simple, inexpensive, efficient and reliable control system for precluding inadvertent and undesirable actuation of hydraulic motor means when the brake associated therewith is engaged or actuated and which simultaneously responds automatically to release or deactuation of the brake to render the hydraulic system operative.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In a vehicle having an earthworking implement supported thereon and a plurality of hydraulic motor means for operating various components including ground engaging means for supporting and driving said vehicle, a control system comprising: a hydraulic fluid reservoir; main hydraulic circuit means including one of said motor means, said reservoir, main pump means for supplying fluid under pressure from said reservoir to said one main motor means, and fluid actuated main valve means actuatable to control flow of pressurized fluid to and from said one motor means; control circuit means including said reservoir, said main valve means, control pump means for supplying fluid under pressure to actuate said main valve means, and manually operated control valve means having conduit means connected to said main valve means for controlling flow of fluid under pressure to and from said main valve means to control actuation thereof; selectively actuatable brake means associated with said one motor means; brake control means for selectively controlling actuation of said brake means independently of operation of said control valve means, said brake control means including a brake conduit leading from said brake means to said reservoir with a manually actuated brake valve in said brake conduit having a first position connecting said brake means to said reservoir and a second position connecting said control pump means to said brake means, bypass means hydraulically connecting said conduit means to said brake conduit when said brake valve is in said first position for directing fluid flow in said control circuit means to said reservoir to preclude actuation of said main valve means, said bypass means preventing hydraulic flow between said conduit means and said brake conduit when said brake valve is in said second position and said control pump means is operative.

2. A control system as defined in claim 1, in which said bypass means includes check valve means between said conduit means and said brake conduit.

3. A control system as defined in claim 2, in which said conduit means includes first and second conduits between said control valve means and opposite ends of said main valve means, and said check valve means includes first and second unidirectional check valves respectively between said first and second conduits and said brake conduit.

* * * * *